F. M. SLOUGH.
ELECTRIC SYSTEM.
APPLICATION FILED JUNE 19, 1912.
1,204,599.
Patented Nov. 14, 1916.
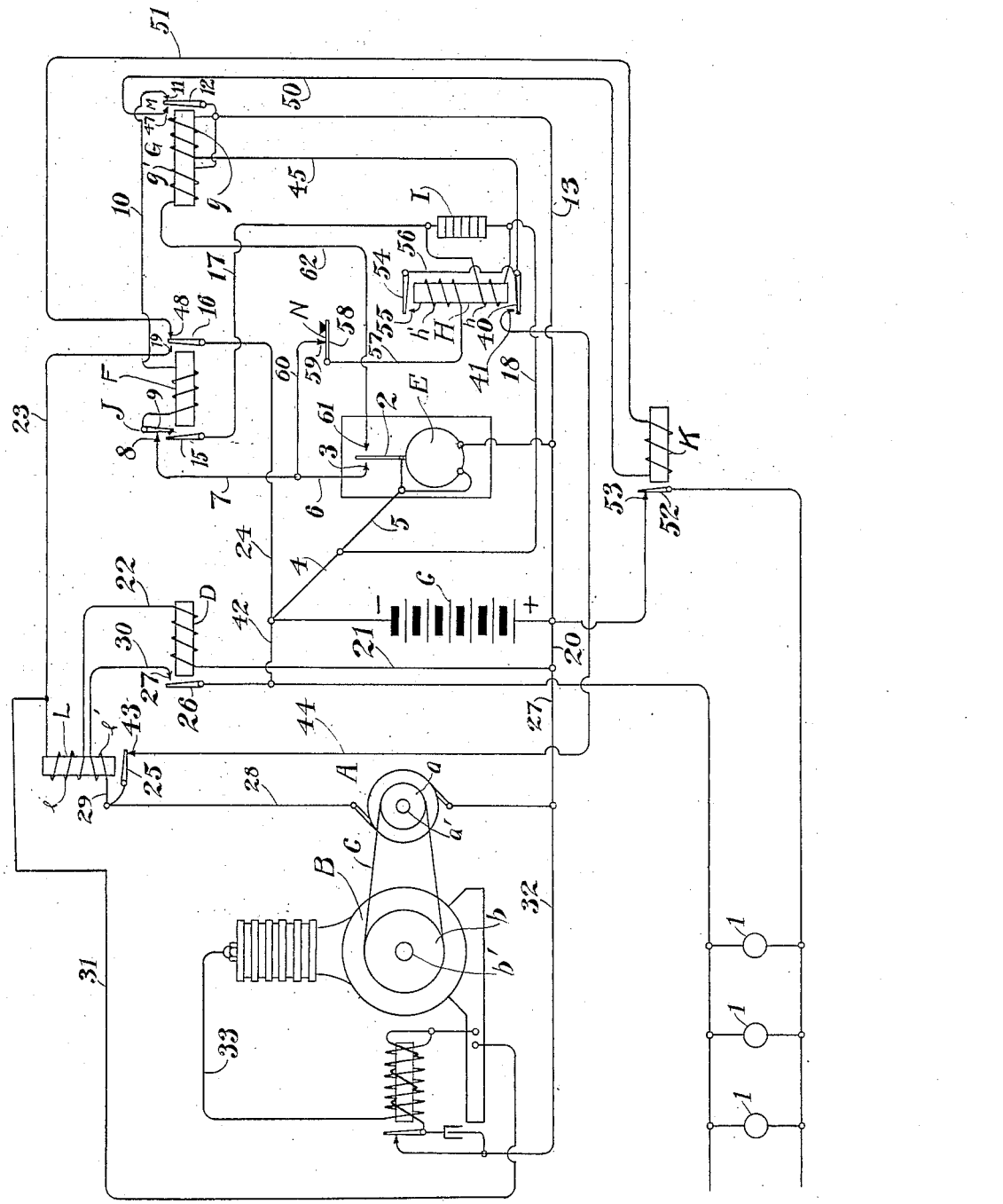
Witnesses
Edgar A. Spurr
Meta Schmittberger
Inventor
Frank M. Slough
By F. O. Richey
His Attorney

UNITED STATES PATENT OFFICE.

FRANK M. SLOUGH, OF ELYRIA, OHIO, ASSIGNOR TO THE GARFORD MANUFACTURING COMPANY, OF ELYRIA, OHIO, A CORPORATION OF OHIO.

ELECTRIC SYSTEM.

1,204,599.   Specification of Letters Patent.   Patented Nov. 14, 1916.

Application filed June 19, 1912. Serial No. 704,505.

*To all whom it may concern:*

Be it known that I, FRANK M. SLOUGH, a citizen of the United States, residing at Elyria, in the county of Lorain and State of Ohio, have invented certain new and useful Improvements in Electric Systems; and I do hereby declare the following to be a full, clear, and exact description of the invention, such as will enable others skilled in the art to which it appertains to make and use the same.

My invention relates to electric systems, and especially to systems adapted for use in isolated places or in places where the attendant is partially or totally unskilled in the art of managing such plants. For example, in lighting systems adapted to be used at country residences or upon farms or other isolated places where there is no attendant, or where those overseeing the operation of the plant are unskilled in the handling of such apparatus, I aim to make the operation of the plant automatic, so that the only attention required will be the supply of fuel to the prime mover and of such other attentions as are required to keep the apparatus in working order. I am aware that efforts have previously been made to accomplish this end, but so far as I am aware, these efforts have resulted in failure.

One of the efforts to which I refer consists in providing a prime mover, a charging machine and a storage device. The connection of the charging machine to the storage device was controlled by mechanism which connected the storage device to the charging machine when the state of affairs in the storage device reached a predetermined condition, connecting it to the charging means, the plan being to have the charging means start upon this current and set the prime mover into operation. One of the troubles experienced with this system which made its operation a failure, was that when the attendant had neglected to supply fuel to the prime mover, or to otherwise condition the charging system for operation, the engine refused to start, so that the system expended itself in a repeated futile effort to start an inoperative engine. Were the engine or other parts of the charging system out of operation, the same futile efforts would result. In consequence of these efforts on the part of the storage battery, the latter was exhausted and frequently the system was broken down, so that it was necessary for the farmer or other inexperienced attendant to send for an expert to place the system in operative condition again. As there was no regular demand for fuel, it frequently happened that the engine would run out of gasolene, so that the evil consequences I have described were of very frequent occurrence in the operation of this system, it being well-known that where casual attention is required, neglect is more apt to occur than where the attention should be regular. These defects were so serious, that the automatic system, has so far as I am aware, been used but little.

One of the objects of my invention is the provision of means for protecting a system of this character, meeting the exigencies described and making the automatic system a practical and commercial success. This I have accomplished in the form shown by providing means for disconnecting the storage device from the charging system when it fails to operate properly: for example, when the engine will not start. I have illustrated in the drawing a convenient means for performing these functions and overcoming the obstacles met in the prior systems.

Another objection to the system heretofore used for automatically controlling the operation of the translating devices as described has been the direct control of the circuit between the accumulator and the charging and starting means through delicate instruments. In power work the switches employed are necessarily strong and massive, requiring considerable effort to operate them. When they are operated by electromagnetic means, such means must be powerful and consequently the current for operating them must be of considerable magnitude. In fact, the current is of such a character that it cannot be successfully controlled by a delicate instrument in the practical operation of systems of this nature. Wherever in the previous systems such control has been exercised through instruments of this kind, failure has resulted. By controlling the electromagnetic means indirectly by the delicate instrument, I am enabled to relieve such instrument of the burden of carrying this heavy current through the contacts of its needle, so that I overcome this objection.

I also provide means for automatically disconnecting the accumulator from the charging system should the engine run out of fuel or the charging system become inoperative for other reasons during the charging period. By such means I prevent the useless expenditure of the energy in the accumulator which has been stored there during the preliminary part of the charging period.

I also provide means for starting the system when the engine has been supplied with fuel, or other fault in the system remedied and the system restored to operative condition. I aim to make this means such as is capable of being operated by inexperienced people.

Other objects of my invention and the invention itself will be understood from a description of the embodiment illustrated in the drawing.

The figure illustrates an embodiment of my invention.

Referring now to the drawing and to the particular embodiments of my invention illustrated therein, at A is shown a dynamo electric machine, such as a direct current generator adapted to be operated as a motor when desired. This machine should be suitable for generating current for lighting and other analogous purposes and for starting an engine, such as a gasolene engine.

At B is shown a prime mover, such as any of the well-known forms of explosive engines. I have here illustrated a gasolene engine, which with the dynamo electric machine constitutes the generating plant or means for supplying energy to the accumulator. The units of the plant are connected together so that power may be transmitted from one to the other. I have illustrated a pair of pulleys and a belt for performing these functions. The pulley $a$ is fastened in any suitable manner to the shaft $a'$ of the dynamo machine; the pulley $b$ is likewise fastened in any suitable manner to the shaft $b'$ of the engine, and a belt $c$ is employed for connecting the two pulleys together and transmitting power between them.

At C I show an energy storing means, such as accumulators or storage batteries, consisting of a suitable number of cells electrically connected together. The dynamo electric machine is adapted, when connected to the battery C to charge the same up to a desired potential.

At D I show a circuit controller controlling the connection of the dynamo A to the battery C.

At E is shown an automatic circuit controller to control the connections of the battery and dynamo. I have here employed a voltmeter to perform this function, though any suitable device may be used.

At F, G, H, K and L I show other circuit controllers whose functions will be best understood from the description of the operation which follows. These circuit controllers may consist of relays, H being a slow acting relay. They coöperate with one another in furnishing, among other things, a protecting means for the system to prevent waste of energy and destruction of parts when the generating plant is inoperative.

The relay H may consist of a slow acting relay whose time of action may be predetermined. In the form shown, I have employed an electrolytic cell or a series of cells in shunt with the main winding $h$ of the relay. The magnet H will not be operated until the battery is charged, since the resistance of the battery will be low enough to shunt the winding $h$ until such battery is charged to a predetermined degree.

At K is shown a fifth relay controlling the power circuit and at L a sixth relay adapted to perform functions to be described.

My invention and its purposes will probably be better understood from a description of the operation of the form illustrated in the drawing. Assuming that the system is in the condition illustrated in the drawing and the energy stored in the battery C is consumed, for example by the lamps 1 until the potential of the battery drops materially, the needle 2 of the voltmeter E will be rotated in a counter-clockwise direction as the potential drops until it reaches a predetermined value, when the needle 2 will engage the contact 3. A circuit will then be completed through the winding of the relay F as follows:—negative pole of battery—conductor 4—conductor 5—2—3—conductor 6—conductor 7—contacts 8 and 9 of the switch J—winding F—conductor 10, contacts 11 and 12 of the switch M—conductor 13 to the positive pole of the battery C. The relay F will be energized, pulling up the armatures 15 and 16. The armature 15 will close a switch at 9—15, breaking the switch J at 8—9 and relieving the needle of the instrument E of the burden of carrying the current for F. This will complete a locking circuit through the relay F independent of the instrument E as follows:—positive pole of battery—C—13—12—11—10—F—9—15—17—$l$ and $h$ in parallel—18—4 to negative pole of battery. The armature 16 will energize the relay L and the relay D as follows:—positive pole of battery—20—21—D—22—$l$—23—19—16—24 to the negative pole of battery. The relay L is not actuated, since the current will be insufficient to pull up the armature 25. The relay D, however, will attract its armature 26, closing a switch 26—27 and connecting the battery with the dynamo A. Current will then flow from the positive pole of the battery—20—27—A—28—29—winding $l'$ of the relay L—30—27—26 to the negative pole of battery. It will be seen that under this condition the current flowing through the windings $l$ and $l'$ of the relay L will be in opposite directions, so that their action will be differential and the relay will remain unactuated. The battery will also supply current through the conductors 31 and 32 to the ignition system 33 of the engine B. The current now starts the dynamo A, which operating as a motor, will through the pulleys and belts, start the gasolene engine B, which will in a little while begin to operate itself and to drive the motor, provided that the engine is in operative condition.

Suppose that the engine is not in working condition, being out of gasolene or inoperative for some other reason. It is one of the objects of my invention to furnish means for protecting the system under these conditions; otherwise the mechanism would continue to endeavor to start the engine until much energy was expended uselessly and perhaps the system was broken down. Should the engine fail to start up within a short period of time, which is predetermined, and which may be set at any desired value, the relay H will be operated over the following circuit:—positive pole of battery—13—12—11—10—F—9—15—17—$h$ and I in parallel—18—4—the negative pole of battery. Current will be flowing through this circuit during the time when the dynamo is endeavoring to start the engine and in time the relay would be operated whether the dynamo was successful in starting the engine or not. Should, however, the engine not be started before this relay is actuated, a circuit will be completed as follows when the relay H pulls up the armature 40 and closes the switch 40—41:—negative pole of battery—42—26—27—30—$l'$—25—43—44—41—40—45—$g$—13—positive pole of battery. The winding $g$ will be energized, pulling up the armature 12, interrupting the circuit of the relay F at 11—12 and closing a switch 12—47. The relay F being de-energized, will release its armatures 15 and 16, interrupting the circuit of the relay D and disconnecting the battery from the dynamo, thus preventing the dynamo doing useless work in endeavoring to start an inoperative engine. The armature 16 will drop back upon a contact 48, completing a circuit through the relay K as follows:—positive pole of battery—13—12—47—50—K—51—48—16—24—the negative pole of battery. The relay K will pull up its armature 52, interrupting the circuit of the lamps at 52—53 and warning the attendant of the inoperative condition of the engine. When the winding $h$ was energized, the armature 54 was pulled up, closing a locking circuit for the relay H through the winding $h$ and the switch 54—55 as follows:—positive pole of battery—13—$g$—45—56—54—55—$h'$—57 —contacts 58 and 59 of the switch N—60— 6—3—2—5—4—negative pole of battery. This locks up the contacts of the relay and the system remains in this condition until the attendant operates the switch N. The attendant now adjusts the condition of the engine until it becomes operative and then operates the switch N which will interrupt the circuit of the relay H, so that it will release its armatures, restoring the system to normal with the switch 2—3 closed. The system will now operate to start the engine as previously described. Suppose, however, that when the dynamo A began to crank the engine B was in operative condition. The engine will be started and in a little while will be running the dynamo as a dynamo and charging the battery C. During this condition, the direction of the current in the circuit 20—27—28—29—42 will be reversed. This will reverse the direction of the current of the winding $l'$, which now acts accumulatively with respect to the winding $l$, so that the relay L will operate, breaking the switch 25—43 and preventing the operation of the relay G by the slow acting relay H when the same pulls up after the expiration of the predetermined period of time at the end of which it is set to operate. The dynamo now charges the storage battery until the same reaches a predetermined condition under which condition the circuit controller E will close the switch 2—61, whereupon a circuit will be completed through the relay G as follows:—negative pole of battery—4—5—2—61—62—G—13 to the positive pole of the battery. The relay G will be energized, pulling up the armature 12 and interrupting the circuit of the relay F. The relay K will not be actuated at this time, since the armature 16 will be drawn up. As soon as the armatures of the magnet F leave their forward contacts 9 and 19, the circuits of the relays D and H will be interrupted, disconnecting the battery from the dynamo. As soon as this is done, the potential of the battery which has been held up by the dynamo, immediately drops sufficiently to break the circuit of the relay G at 2—61, restoring the relay G to normal. When the relay D lets go its armature, the ignition circuit of the engine will be interrupted and the engine will stop, so that the entire system will be restored to normal.

Should the generating plant stop during the charging, current will of course, cease to flow from the dynamo to the battery. On the contrary, current will flow in the opposite direction through the winding $l'$ as previously described in the starting of the charging operation. This current will energize the winding $l'$ adverse to the winding $l$, so that the armature 25 will drop back, completing the circuit of the winding $g$ of the relay G and through the contacts 40—41 of the relay H as previously described. The system will then be restored to normal, since the relay G will break the circuit of F and that relay will open the circuit of F, D and L.

The needle of the instrument E will gradually return to its engagement with the contact 3, whereupon the system will endeavor to re-start the engine. If the failure were due to some condition which had been righted in the interim, the engine will be restarted but if otherwise, the dynamo will be cut off and the alarm given after the failure of the engine to re-start.

It will be apparent that any suitable form of circuit controllers may be employed where I have shown the relays, that any suitable form of slow acting relay may be employed at H and that any convenient and efficient form of circuit controller may be employed at E.

I have likewise shown the lamps used as a warning means, though it will readily be apparent to those skilled in the art that a bell, semaphore, or a lamp independent of the lighting circuit may be used. In fact, it will be obvious to those skilled in the art that numerous and extensive departures from the form and details of the apparatus here shown may be made without departing from the spirit of this invention, the same being herein shown solely for the purpose of clearly illustrating one specific embodiment thereof.

I claim:—

1. In an electric system, an accumulator, a dynamo electric machine for charging said accumulator, a prime mover for actuating said dynamo electric machine to charge said accumulator, means acting automatically for connecting said accumulator to said dynamo electric machine when the voltage in said accumulator reaches a predetermined value, electro-magnetic means for disconnecting said accumulator from said dynamo electric machine, disabling means for said electromagnetic means and means to disable said disabling means when said prime mover is in inoperative condition.

2. In an electric system, an accumulator, a dynamo electric machine for supplying energy to said accumulator, a prime mover for actuating said dynamo electric machine, means acting automatically for connecting said dynamo electric machine to said accumulator when the condition of said accumulator reaches a predetermined state, means for disconnecting said accumulator and said dynamo electric machine, a slow acting relay controlling said disconnecting means, said disconnecting means being inoperative if the dynamo-electric machine is operative to supply energy to said accumulator.

3. In an electric system, an accumulator, means for supplying energy to said accumulator, means for disconnecting said accumulator and said energy supplying means should said energy supplying means be inoperative to supply energy to said accumulator, a slow acting relay to operate said disconnecting means, and electromagnetic disabling means for said slow acting relay.

4. In an electric system, an accumulator, means for supplying energy to said accumulator to charge the same, a device responsive to the condition of said accumulator, time limited mechanism, means controlled by said device and said mechanism for automatically disconnecting said accumulator from said energy supplying means, and electromagnetic disabling means responsive to the flow of current from said energy supplying means to said accumulator to disable said automatic disconnecting means.

5. In an electric system, the combination of an accumulator, means for supplying energy to said accumulator to charge the same, a time limited element, means controlled by said time limited element for automatically disconnecting said energy supplying means from said accumulator, and strength of current operated means for disabling said time limited element.

6. In an electric system, the combination of an accumulator, means for supplying energy to said accumulator, means for automatically disconnecting said accumulator and said energy supplying means should said energy supplying means be inoperative to supply energy to said accumulator and a locking device for said disconnecting means.

7. In an electric system, an accumulator, means for supplying energy to said accumulator to charge the same, means for automatically disconnecting said accumulator from said energy supplying means should said energy supplying means be inoperative to supply energy to said accumulator, a locking device for said disconnecting means and means for releasing the locking device.

8. In an electric system, the combination of an accumulator for the storage of electric energy, a dynamo electric machine for charging said accumulator, a prime mover for actuating said dynamo electric machine, said dynamo electric machine adapted to start said prime mover, means for disconnecting said dynamo electric machine from said accumulator when the condition of the accumulator reaches a predetermined value, a relay controlling said last named means, a locking circuit for locking said relay and means for releasing said relay.

9. In combination, an internal combustion engine, a dynamo electric machine for starting said engine, a circuit for said dynamo electric machine, an ignition circuit for said engine, an electrically restorable alarm device, a circuit therefor, means for automatically interrupting the circuit of said dynamo electric machine and said ignition circuit and closing the circuit of said alarm device, and manually controlled automatic means for restoring said alarm device.

10. In an electric system, the combination of an accumulator, means to automatically start the charging of the accumulator, means for giving a warning signal should said starting means fail to start the charging, and manually controlled automatic means for retiring said warning signal and to re-energize said automatic starting means.

11. In an electric system, the combination of an accumulator, means for supplying energy to said accumulator to charge the same, electromagnetic means controlling the connection of said accumulator to said charging means, second electromagnetic means controlling said first electromagnetic means, a circuit for said second electromagnetic means adapted to be interrupted when said second electromagnetic means is operated and a locking circuit for said second electromagnetic means controlled thereby.

12. In an electric system, the combination of an accumulator, means for supplying energy to said accumulator to charge the same, an electromagnet controlling the connection of said accumulator and said charging means, a second electromagnet controlling said first electromagnet, a device responsive to the condition of said accumulator controlling said second electromagnet and a locking circuit for said second electromagnet controlled by said second electromagnet.

13. In an electric system, the combination of an accumulator, means for charging said accumulator, electromagnetic means controlling the connection of said accumulator to said charging means, a locking circuit for said electromagnetic means controlled thereby and a device responsive to the condition of said accumulator controlling said electromagnet.

14. In an electric system, the combination of an accumulator, means for charging said accumulator, electromagnetic means controlling the connection of said accumulator to said charging means, a circuit for said electromagnetic means adapted to be interrupted by said electromagnetic means when the same is energized, a locking circuit closed by said electromagnetic means when energized and a device responsive to the condition of said accumulator controlling said electromagnetic means.

15. In an electric system, the combination of an accumulator, a dynamo electric machine for charging said accumulator, a prime mover adapted to be started by said machine and when started to drive said machine to charge said accumulator, a signaling device for giving a warning signal when said prime mover is in inoperative condition, electromagnetic mechanism for operating said signaling device, and a switch under the control of the operator for electrically restoring said electromagnetic mechanism.

16. In an electric system, the combination of an accumulator, means for charging said accumulator, means contingent upon the condition of the charge in said accumulator for automatically connecting said charging means to said accumulator and disconnecting it therefrom, a circuit controlled by said means for connecting said accumulator and said charging means and electrically restorable mechanism controlled by the direction of flow of current in said circuit for automatically disconnecting said accumulator from said charging means, said mechanism conditioned to operate to effect said disconnection should the current in said circuit continue to flow from the accumulator to the charging means after a predetermined period of time.

17. In an electric system, the combination of an accumulator, a dynamo electric machine for charging said accumulator, a prime mover for actuating said machine, said machine adapted to start said prime mover, electromagnetic means adapted to be actuated at the end of a predetermined period of time to disconnect said accumulator from said machine, should said machine fail to start said prime mover within such period, and electrically restorable controlling means for said electromagnetic means.

18. In an electric system, the combination of an accumulator, a dynamo electric machine for charging said accumulator, a prime mover for driving said machine, said machine adapted to start said prime mover, electrically restorable means for automatically disconnecting said machine from said accumulator, locking means for said disconnecting means and a switch for releasing said locking means.

19. In an electric system, the combination of an accumulator, means for charging said accumulator including a prime mover and a dynamo-electric machine adapted to be used as a motor to start said prime mover, a circuit for connecting said accumulator to said dynamo-electric machine to supply current to operate said dynamo-electric machine as a motor, means for automatically disconnecting said accumulator and said charging means should said dynamo-electric machine fail to start said prime mover within a predetermined period of time, automatic restoring means for said automatic disconnecting means and a circuit under the control of the operator controlling said automatic restoring means.

20. In an electric system, the combination of an accumulator, means for charging said accumulator, means for automatically causing the connection of said accumulator to said charging means when the charge in the accumulator has reached a predetermined value and mechanism for maintaining such connection independent of said means.

21. In an electric system, the combination of an accumulator, means for charging said accumulator, a meter for automatically causing the connection of said accumulator to said charging means when the charge in the accumulator has reached a predetermined value and electro-magnetic means for maintaining such connection independent of said meter.

22. In an electric system, the combination of an accumulator, a dynamo electric machine for charging said accumulator, a prime mover for actuating said dynamo electric machine, said dynamo electric machine adapted to start said prime mover, means to automatically cause the restarting of said prime mover should said prime mover fail during the operation, means controlling the first named means rendering the same inoperative should the machine fail to re-start the prime mover, a signal operated should said machine fail to re-start the prime mover, electrically operated locking means for said signal to maintain it in operation, a circuit for said electrically operated locking means and a switch in said circuit under the control of the operator, said switch controlling said signal and said automatic restarting means.

23. In an electric system, the combination of an accumulator, means for supplying energy to said accumulator to charge the same, a time-limited element, means controlled by said time-limited element for automatically disconnecting said energy supplying means from said accumulator and strength of current operated means for preventing the operation of said automatic disconnecting means by said time-limited element.

24. The combination of a battery, a dynamo, an electric circuit including both, an engine adapted to drive said dynamo, said engine adapted to be started by said dynamo driving it when acting as a motor, a cut-out in said circuit adapted to open the circuit between said battery and said dynamo, an electro-responsive device having a movable element adapted to occupy a certain position when the potential of said circuit falls below a predetermined minimum, a contact element with which said movable device is adapted to contact when it occupies said certain position, a secondary electric circuit, one pole of which is connected to said movable element and the other pole to said contact element whereby said secondary circuit is closed when said movable element occupies said certain position, a cut-out device adapted to cause the opening of the main cut-out by its opening, and a time-device adapted to open said cut-out device after a predetermined interval of operation, said time-device being electrically governed by the closing of said secondary circuit.

In testimony whereof I have affixed my signature in the presence of two witnesses.

FRANK M. SLOUGH.

Witnesses:
EDGAR A. SPURR,
F. O. RICHEY.